United States Patent [19]

Hermann et al.

[11] 4,350,288
[45] Sep. 21, 1982

[54] FLUID FUEL HEATING SYSTEM

[75] Inventors: Joerg Hermann, Gauting; Werner Baier, Gauting-Stockdorf; Josef Breidbach, Feldafing, all of Fed. Rep. of Germany

[73] Assignee: Webasto-Werk W. Baier GmbH and Co., Munich, Fed. Rep. of Germany

[21] Appl. No.: 176,149

[22] Filed: Aug. 7, 1980

[30] Foreign Application Priority Data

Aug. 7, 1979 [DE] Fed. Rep. of Germany ....... 2931936

[51] Int. Cl.³ ............................................... B60H 1/02
[52] U.S. Cl. ............................ 237/12.3 C; 126/110 B; 431/258
[58] Field of Search .................... 237/12.3 C; 431/258, 431/262; 126/110 B

[56] References Cited

U.S. PATENT DOCUMENTS 2,308,887 1/1943 McCollum ...................... 237/12.3 C
3,174,277 3/1965 Hettich .......................... 237/12.3 C

FOREIGN PATENT DOCUMENTS 2251184 7/1973 Fed. Rep. of Germany .
114373 9/1979 Japan .................................... 431/258

Primary Examiner—Ronald C. Capossela
Attorney, Agent, or Firm—Craig and Antonelli

[57] ABSTRACT

A heating system in which the rpm of the combustion air blower can be selectively decreased by an especially simple and economical arrangement and is achieved by selectively connecting an incandescent plug, utilized for igniting the fuel-mixture only during the starting period, as a series resistor to the electric motor driving the combustion air blower after completion of the starting period. In accordance with a preferred embodiment, connecting of the incandescent plug as a series resistor is produced by way of a relay operated contact and an actuating circuit therefor, a selectively closable switch and a contact of a combustion monitoring thermostat being located in the actuating circuit for controlling activation of the relay operated contact.

2 Claims, 1 Drawing Figure

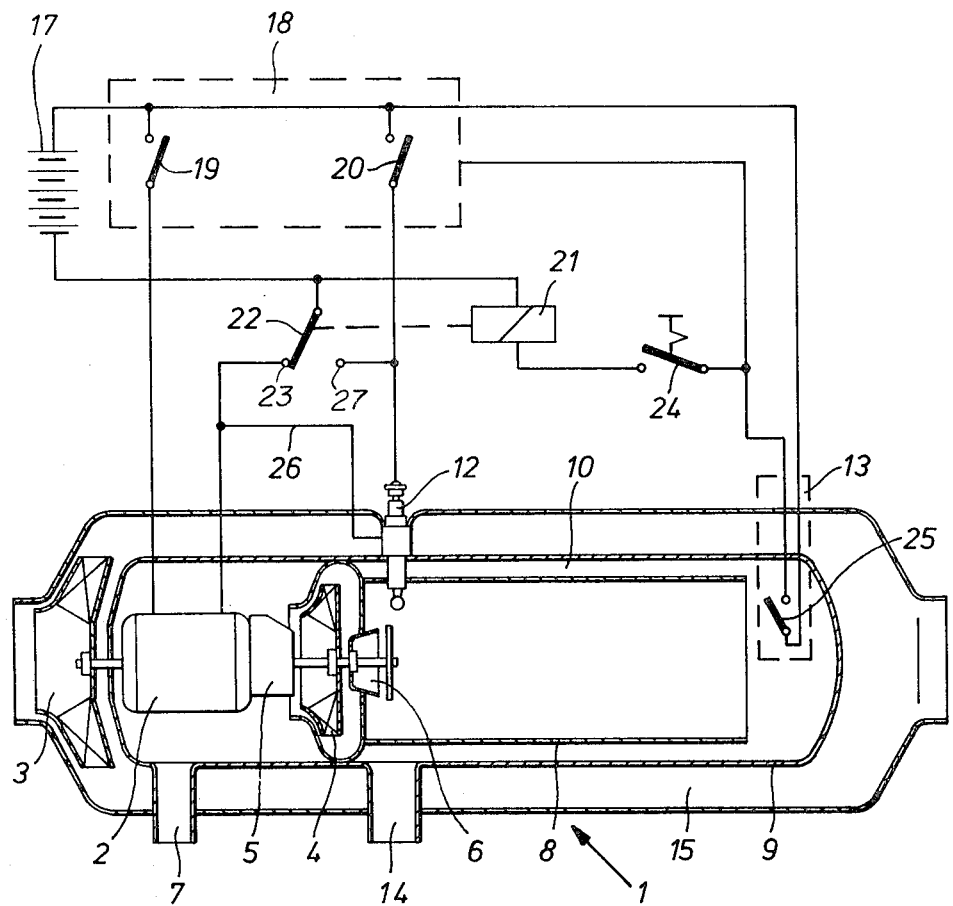

FLUID FUEL HEATING SYSTEM

BACKGROUND AND SUMMARY OF THE INVENTION

The invention relates to a fluid fuel heating system intended especially for vehicles and comprising a burner unit provided with a combustion air blower driven by an electric motor and an incandescent plug igniting the fuel-air mixture only during the starting period.

In known heating systems of this type (German application (Offenlegungsschrift) No. 2,251,184) it is sometimes desirable to decrease the combustion air blower rpm to reduce the heat output and the noise level. A two-stage motor with change-over winding can be used for this purpose, but such motors are expensive. In another aspect of this known arrangement, a series resistor is placed in the motor circuit to reduce the rpm. However, such a series resistor constitutes an additional element which complicates the arrangement and increases its size.

Thus, an object of the present invention is to provide a heating system in which the rpm of the combustion air blower can be selectively decreased by an especially simple and economical means.

According to preferred embodiment of the invention this object is achieved by selectively connecting the incandescent plug as a series resistor to the electric motor driving the combustion air blower after completion of the starting period. Therefore, according to the invention, the incandescent plug which is normally present but heretofore necessary only during the starting period, is utilized when needed as a series resistor to reduce the blower rpm following the starting period. Thus, an additional element in the form of a special series resistor is eliminated.

For a fixed blower diameter the noise of the combustion air blower is determined substantially by the rpm. As the rpm decreases the heat output also drops, and the power consumption of the heating system diminishes. Therefore, the above arrangement can be considered as a partial load circuit. Such a partial load circuit can be used with advantage especially when one of the following conditions is of high importance:

Heating of small rooms or at mild temperatures when, except for the initial heat-up phase, a low heat output is sufficient;

Heating of residential or bed rooms in which a low noise level is highly desired; and Continuous operation of a battery-supplied heating system with the lowest possible power consumption.

In an embodiment of the invention a relay is provided to connect the incandescent plug as a series resistor in the motor circuit, and a selectively closable switch contact and one contact of a combustion monitoring thermostat are contained in an actuating circuit of said relay. The contact of the combustion monitoring thermostat assures that the incandescent plug operates at full power even when the heating system is switched to partial load.

These and further objects, features and advantages of the present invention will become more obvious from the following description when taken in connection with the accompanying drawing which show for purposes of illustration only, several embodiments in accordance with the present invention.

The sole FIGURE of the drawing represents, schematically, a heating system with an associated partial load circuit in accordance with a preferred embodiment of the invention.

DETAILED DESCRIPTION OF THE PREFERRED EMBODIMENT

The illustrated heating system comprises a burner unit 1 with an electric motor 2 which drives a hot air blower 3, a combustion air blower 4, a fuel pump 5, and a rotary atomizer 6. Together with the fuel sprayed by rotary atomizer 6, the combustion air sucked through an intake line 7 is forced into a tubular combustion chamber 8 which, with a tube 9, forms an exhaust gas passage 10. During the starting period the fuel-air mixture is ignited by an incandescent plug 12. A combustion monitoring thermostat 13 disconnects the incandescent plug when the combustion is regular after the starting period. The exhaust gases flowing back in exhaust passage 10 pass into an exhaust pipe 14. The heat generated is released into the hot air drive by hot air blower 3 in a hot air passage 15.

Electric motor 2 and incandescent plug 12 are powered by a battery 17 through a control unit 18 represented simply as a block and comprising in particular a switch contact 19 in the motor circuit and a switch control 20 in the incandescent plug circuit. The arrangement described so far is known.

A relay 21 with a change-over contact 22 is also provided. A manually actuated switch 24 and, in series therewith, a contact 25 of combustion monitoring thermostat 13 are arranged in the circuit of the coil of relay 21.

The system operates as follows.

In the stopped condition, upon starting, contact 20 in control unit 18 is first closed (by means not specifically shown) for a predetermined preliminary initial incandescence time of for example 60 seconds. Then motor 2 is started on closing of contact 19. Fuel pump 5 forces fuel to atomizer 6 whose rotation sprays the fuel finely to mix with the air driven by combustion air blower 4 and produce an inflammable fuel-air mixture. Said mixture is ignited by connected incandescent plug 12. When the combustion is regular, the contact 25 of combustion monitoring thermostat 13 closes and contact 20 in control unit 18 opens, so that incandescent plug 12 is disconnected. At this point the starting period has been completed.

At the time of change to partial load operation switch 24 is closed manually. Relay 21 attracts and contact 22 changes over from the position shown at terminal 23 to one at terminal 27. Current flows from battery 17, over closed switch 19, motor 2, a line 26, incandescent plug 12, and contact 22, back to battery 17. Therefore, motor 2 and incandescent plug 12 are connected in series. Plug 12 constitutes a series resistor for motor 2. Motor 2 runs at a lower rpm. To return to full load switch 24 is simply opened. Because relay 21 can attract only when switch 24 is closed, until switch contact 25 (which is open when cold) closes, the incandescent plug is reliably supplied with full power regardless of the position of switch 24, even in the stopped position.

The important data applicable to a 12-volt system are compiled in the following table for full load and partial load.

| Operational Parameters | Measure | Full Load | Partial Load |
| --- | --- | --- | --- |
| Voltage at motor | V | 12 | 9.2 |
| Power consumption | W | 46 | 36 |
| Rpm | min$^{-1}$ | 8,400 | 6,300 |
| Temperature at hot air outlet (hottest point) | °C. | 130 | 124 |
| Noise level (source noise) | | | |
| Hot air inlet | dbA | 78 | 71 |
| Exhaust gas | dbA | 85 | 82 |
| Efficiency | % | 79 | 82 |

It is apparent that in this embodiment the rpm is decreased by approximately 25% in partial load operation. The blower noise is reduced by 7 dbA. The heat output drops by approximately 20%.

Long duration tests have shown that the continuous application of the motor current to the incandescent plug has no adverse effect on the life of said plug. The incandescent plug windings usually remain cleaner because of the high temperature.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A fluid fuel heating system comprising:
   (a) a burner unit having a combustion air blower, an electric motor drivingly connected to said blower, and an incandescent plug for igniting the fuel-air mixture only during a starting period; and
   (b) a powering circuit operatively connected to said electric motor and said incandescent plug for supplying electric power thereto, said powering circuit having circuit means for selectively incorporating said incandescent plug into said powering circuit in series with said electric motor as a series resistor to reduce the blower rpm after completion of the starting period.

2. A heating system according to claim 1, wherein said circuit means comprises a relay operated contact and an actuating circuit therefor, wherein a selectively closable switch and a contact of a combustion monitoring thermostat are located in said actuating circuit for controlling activation of said relay operated contact.

* * * * *